United States Patent
Wang et al.

(10) Patent No.: US 12,434,764 B2
(45) Date of Patent: Oct. 7, 2025

(54) ELECTRIC MULTI-MODE STEER-BY-WIRE SYSTEM AND MODE SWITCHING METHOD THEREOF

(71) Applicant: Jilin University, Changchun (CN)

(72) Inventors: Junnian Wang, Changchun (CN); Ruihao Fan, Changchun (CN); Haolun Gu, Changchun (CN); Kefu Zhu, Changchun (CN); Dongxu Fu, Changchun (CN); Shuo Zhuang, Changchun (CN)

(73) Assignee: Jilin University, Changchun (CN)

( * ) Notice: Subject to any disclaimer, the term of this patent is extended or adjusted under 35 U.S.C. 154(b) by 623 days.

(21) Appl. No.: 17/882,853

(22) Filed: Aug. 8, 2022

(65) Prior Publication Data
US 2023/0033401 A1 Feb. 2, 2023

(30) Foreign Application Priority Data
Aug. 9, 2021 (CN) .......................... 202110907977.1

(51) Int. Cl.
*B62D 7/15* (2006.01)
*B62D 5/04* (2006.01)

(52) U.S. Cl.
CPC ......... *B62D 7/1509* (2013.01); *B62D 5/0463* (2013.01); *B62D 5/0493* (2013.01)

(58) Field of Classification Search
CPC .............. B62D 7/1509; B62D 5/0463; B62D 5/0493
See application file for complete search history.

(56) References Cited

U.S. PATENT DOCUMENTS

2005/0072621 A1 * 4/2005 Hara ...................... B62D 1/163
180/444

FOREIGN PATENT DOCUMENTS

| CN | 111923996 | A |   | 11/2020 |            |
|----|-----------|---|---|---------|------------|
| CN | 113212542 | A |   | 8/2021  |            |
| EP | 3098139   | A1| * | 11/2016 | B62D 5/001 |
| JP | 2006151074| A | * | 6/2006  |            |
| JP | 2014156151| A | * | 8/2014  |            |
| JP | 2020001558| A | * | 1/2020  |            |

* cited by examiner

*Primary Examiner* — Jacob D Knutson

(57) ABSTRACT

An electric multi-mode steer-by-wire system and a mode switching method thereof. The electric multi-mode steer-by-wire system includes a steering hand wheel unit including a steering hand wheel, a road-feeling motor, a reducer and an electromagnetic clutch, a steering execution unit including two steering electric motor mechanisms, a steering gear and two steering road wheels, an electronic control unit configured to control the steering hand wheel unit and the steering execution unit to achieve switching among two-side steering-road-wheel independent steer-by-wire mode, steering-trapezoidal steer-by-wire mode and electric power steering mode, and a mode selection and display unit. The electromagnetic clutch connected to the steering execution unit. The steering electric motor mechanisms drive the steering road wheels to steer independently through lead screw-nut pairs; or respectively form a hydraulic cylinder with the steering gear to jointly or independently drive the steering road wheels to steer with steering-trapezoidal manner.

5 Claims, 8 Drawing Sheets

ELECTRIC MULTI-MODE STEER-BY-WIRE SYSTEM AND MODE SWITCHING METHOD THEREOF

CROSS-REFERENCE TO RELATED APPLICATIONS

This application claims the benefit of priority from Chinese Patent Application No. 202110907977.1, filed on Aug. 9, 2021. The content of the aforementioned application, including any intervening amendments thereto, is incorporated herein by reference in its entirety.

TECHNICAL FIELD

This application relates to automotive steer-by-wire technology, and more particularly to an electric multi-mode steer-by-wire system and a mode switching method thereof.

BACKGROUND

X-by-wire technology has been extensively adopted in the automotive steering system. As a key technology to ensure active safety and maneuvering stability of energy saving and new energy vehicles and intelligent connected vehicles, the steer-by-wire system can eliminate the mechanical connection such as steering column to protect drivers from being injured by the steering column in the crash, enhancing the driving safety. The intelligent steer-by-wire system can determine whether the driver's operation is reasonable according to the driving status of the vehicle, and make corresponding adjustments, so as to improve the driving performance, maneuverability, driver's road feeling and ride comfort. Regarding the steer-by-wire system, all mechanical connections between the steering hand wheel unit and the steering execution unit are removed; a control system is employed to determine driving intentions based on sensor sensing signals; the steering power is provided by a steering motor only; and the road information can be obtained through a road sensing simulation motor, which not only provides the driver with sufficient road perception, but also can avoid the driving interference and fatigue caused by the road bumps. In addition, since the steer-by-wire system can flexibly design the force and angle transmission characteristics of the steering, the contradiction between "handiness and flexibility" in the design of transmission ratio of the steering system can be fundamentally addressed. Also, the space of engine cabin and cockpit is greatly optimized due to the elimination of some steering mechanisms. By comparison, the steer-by-wire system without mechanical connection is more in line with the current technical needs of the intelligent unmanned driving and automatic parking, and promotes the development of advanced technologies such as autonomous driving, unmanned driving, and intelligent assisted driving. Notwithstanding, the steering actuator mechanism in the existing steer-by-wire system still uses a traditional steering-trapezoidal structure to perform the geometric steering motion, and still fails to achieve the steering angle decoupling of left and right wheels. Furthermore, the existing steer-by-wire system only relies on the electronic redundancy backup to improve functional safety, and lacks of a mechanical redundancy backup structure and multiple working modes. Therefore, in the case of the failure of the electrical and electronic components in the system, the steering behavior cannot be normally performed, affecting the safety of the entire steer-by-wire operation.

SUMMARY

In order to overcome the above-mentioned deficiencies in the prior art, the present disclosure provides an electric multi-mode steer-by-wire system (with a novel distributed steer-by-wire structure) and a mode switching method thereof. The switching among three steering modes (namely two-side steering-road-wheel independent steer-by-wire mode, steering-trapezoidal steer-by-wire mode and electric power steering (EPS) mode) is automatically controlled by an electronic control unit or manually performed by the driver, all through mode selection buttons according to the vehicle dynamics state and a fault failure state of a steering execution unit. The electric multi-mode steer-by-wire system enables the decoupling of steering angles of left and right wheels, and the redundant backup of the steering structure, such that it can still ensure the reliable steering movement in the case of the failure of electronic components or electrical equipment, greatly enhancing the functional safety of the steer-by-wire system.

Technical solutions of this application are described as follows.

In a first aspect, this application provides an electric multi-mode steer-by-wire system, comprising:
  a steering hand wheel unit, configured to be manipulated by a driver to input a steering action;
  a steering execution unit, configured to perform a wheel steering action;
  a mode selection and display unit, configured for manual steering mode selection and state display; and
  an electronic control unit, configured to receive a state signal and send a control instruction;
  wherein the steering hand wheel unit comprises a steering hand wheel, a torque and angle sensor (TAS), a road-feeling motor, a reducer for the road-feeling motor, an electromagnetic clutch, a torsion bar, a steering drive shaft, an upper transmission shaft, two pins, a first steering universal joint, a second steering universal joint and a lower transmission shaft; and the reducer is a worm gear-worm reducer;
  the steering execution unit comprises a pair of steering road wheels, a first steering electric motor mechanism, a second steering electric motor mechanism, a steering gear, a first lead screw position sensor, a second lead screw position sensor, a first electromagnetic valve, a second electromagnetic valve and an oil tank; an upper end of the steering gear is connected to the steering hand wheel unit; a first lateral end of the steering gear is connected to the first steering electric motor mechanism, and a second lateral end of the steering gear is connected to the second steering electric motor mechanism; the first steering electric motor mechanism is connected to the one of the pair of steering road wheels through a first steering tie rod; the second steering electric motor mechanism is connected to the other of the pair of steering road wheels through a second steering tie rod; a main body of each of the first steering electric motor mechanism and the second steering electric motor mechanism is composed of a coreless motor and a lead screw-nut motion conversion mechanism; and the first electromagnetic valve and the second electromagnetic valve are both connected to the oil tank to control communication between an oil pipe and the oil tank;

the mode selection and display unit comprises a first mode selection button, a second mode selection button, a third mode selection button and a central control panel; and the electronic control unit is connected to the road-feeling motor, the TAS, the electromagnetic clutch, the first lead screw position sensor, the second lead screw position sensor, the first electromagnetic valve, the second electromagnetic valve, the first steering electric motor mechanism, the second steering electric motor mechanism, the first mode selection button, the second mode selection button and the third mode selection button through a signal wire, respectively; and the electronic control unit is connected to the central control panel through a controller area network (CAN) bus.

In some embodiments, the electric multi-mode steer-by-wire system is configured to be controlled by the electronic control unit to achieve switching among a two-side steering-road-wheel independent steer-by-wire mode, a steering-trapezoidal steer-by-wire mode and an electric power steering mode according to vehicle dynamics state and a fault failure state of the steering execution unit, or to be manually controlled to achieve the switching among the two-side steering-road-wheel independent steer-by-wire mode, the steering-trapezoidal steer-by-wire mode and the electric power steering mode through selection of the first mode selection button, the second mode selection button or the third mode selection button; and the steering-trapezoidal steer-by-wire mode and the electric power steering mode are configured to play a fail-to-safe backup role for the two-side steering-road-wheel independent steer-by-wire mode; and the electric power steering mode is also configured to play a fail-to-safe backup role for the steering-trapezoidal steer-by-wire mode.

In some embodiments, the road-feeling motor is connected to the upper transmission shaft through the reducer; an upper end of the torsion bar is connected to a lower end of the steering drive shaft through one of the two pins; a lower end of the torsion bar is connected to an upper end of the upper transmission shaft through the other of the two pins; the TAS is mounted on the steering drive shaft; an upper end of the steering drive shaft is connected to the steering hand wheel; a lower end of the upper transmission shaft is connected to an upper end of the electromagnetic clutch through the first steering universal joint; and a lower end of the electromagnetic clutch is connected to the lower transmission shaft through the second steering universal joint.

In some embodiments, the first steering electric motor mechanism comprises a first motor housing, a first end cover, a first stator, a first rotor, a first lead screw, a first seal ring and a first oil collar;

the second steering electric motor mechanism comprises a second motor housing, a second end cover, a second stator, a second rotor, a second lead screw, a second seal ring and a second oil collar;

the first seal ring and the second seal ring are O-shaped;
the first housing is boltedly connected to the steering gear;
the second housing is boltedly connected to the steering gear;
the first end cover is boltedly connected to the first motor housing;
the second end cover is boltedly connected to the second motor housing;
the first stator is fixed at an inner wall of the first motor housing;
the second stator is fixed at an inner wall of the second motor housing;
the first rotor is provided with a first central threaded inner hole; and the first rotor is supported on the first motor housing through a first bearing;
the second rotor is provided with a second central threaded inner hole; and the second rotor is supported on the second motor housing through a second bearing;
the first lead screw has an inner hydraulic chamber with a bottom hole, and an outer threaded cylindrical surface; and the first lead screw is matched with the first rotor to form a first sliding screw pair, so as to convert rotation of the first rotor into translation of the first lead screw;
the second lead screw has an inner hydraulic chamber with a bottom hole, and an outer threaded cylindrical surface; and the second lead screw is matched with the second rotor to form a second sliding screw pair, so as to convert rotation of the second rotor into translation of the second lead screw;
the first O-shaped seal ring is provided inside the first lead screw to seal the inner hydraulic chamber of the first lead screw;
the second O-shaped seal ring is provided inside the second lead screw to seal the inner hydraulic chamber of the second lead screw;
the first oil collar is fixed at the bottom hole of the first lead screw to realize pipe connection between the inner hydraulic chamber of the first lead screw and the first electromagnetic valve; and
the second oil collar is fixed at the bottom hole of the second lead screw to realize pipe connection between the inner hydraulic chamber of the second lead screw and the second electromagnetic valve.

In some embodiments, the steering gear comprises a steering gear housing, a steering gear shaft, a third end cover, a third seal ring, a first nut, a second nut, a rack support base, a rack, an adjustment screw plug and a third nut;

the steering gear housing is configured to accommodate parts of the steering gear; one end of the steering gear housing is connected to the first motor housing to form a chamber to provide space for retraction of the first lead screw, and the other end of the steering gear housing is connected to the second motor housing to form a chamber to provide space for retraction of the second lead screw;
the steering gear shaft is mounted on an inner wall of the steering gear housing through a third bearing; an upper end of the steering gear shaft is mechanically connected to the lower transmission shaft through the third steering universal joint to transmit a steering torque; and a middle portion of the steering gear shaft is provided with a pinion;
the third end cover is boltedly and fixedly connected to the steering gear housing;
the third seal ring is provided between the third end cover and the steering gear shaft to achieve sealing of lubricating greases;
the first nut is connected to the steering gear shaft through a first screw thread pair;
the second nut is connected to the steering gear housing through a second screw thread pair;
the rack is supported on the steering gear housing through the rack support base and a bushing, and is engaged with the pinion at the middle portion of the steering gear shaft for transmission; and the rack is sealed with two ends of the first lead screw to form a first hydraulic cylinder, and sealed with two ends of the second lead screw to form a second hydraulic cylinder;

the adjustment screw plug is screwedly arranged in the steering gear housing, and is configured to press the rack support base by means of a spring to eliminate transmission clearance of a pinion-rack pair; and the third nut is configured to lock the adjustment screw plug.

In a second aspect, this application provides a mode switching method of an electric multi-mode steer-by-wire system configured to switch among a mode switching main program, a subprogram for the two-side steering-road-wheel independent steer-by-wire mode, a subprogram for the steering-trapezoidal steer-by-wire mode and a subprogram for the electric power steering mode.

The mode switching main program, comprising:

(1) allowing the electric multi-mode steer-by-wire system to perform self-checking; and recording an operation state of a first steering motor and a second steering motor;

(2) reading status of a mode selection signal;

(3) determining whether a driver performs mode selection; if no, proceeding to step (6);

(4) determining whether the mode selection signal is selection of a two-side steering-road-wheel independent steer-by-wire mode; if yes, proceeding to step (6);

(5) determining whether the mode selection signal is selection of a steering-trapezoidal steer-by-wire mode; if no, proceeding to step (7);

(6) according to the operation state of the first steering motor and the second steering motor, and the status of the mode selection signal, determining whether the first steering motor and the second steering motor fail;

if the first steering motor and the second steering motor are both in normal operation, and the mode selection signal is OFF or is selection of the two-side steering-road-wheel independent steer-by-wire mode, proceeding to step (8);

if only one of the first steering motor and the second steering motor does not fail, and the mode selection signal is OFF, or is selection of the steering-trapezoidal steer-by-wire mode, proceeding to step (7);

if the first steering motor and the second steering motor both fail, and the mode selection signal is OFF, proceeding to step (10);

if the first steering motor and the second steering motor both fail, and the mode selection signal is selection of the steering-trapezoidal steer-by-wire mode, proceeding to step (14);

if only the first steering motor fails, and the mode selection signal is selection of the two-side steering-road-wheel independent steer-by-wire mode, proceeding to step (12); and if only the second steering motor fails, and the mode selection signal is selection of the two-side steering-road-wheel independent steer-by-wire mode, proceeding to step (13);

(7) determining whether the two-side steering-road-wheel independent steer-by-wire mode is selected in a previous cycle;

if yes, and the mode selection signal is not selection of an electric power steering mode, proceeding to step (11) and then to step (9);

if no, and the mode selection signal is not selection of the electric power steering mode, proceeding to step (9);

if yes, and the mode selection signal is selection of the electric power steering mode, proceeding to step (11) and then to step (10); and if no, and the mode selection signal is selection of the electric power steering mode, proceeding to step (10);

(8) operating a subprogram for the two-side steering-road-wheel independent steer-by-wire mode;

(9) operating a subprogram for the steering-trapezoidal steer-by-wire mode;

(10) operating a subprogram for the electric power steering mode;

(11) operating an angle compensation alignment subprogram;

(12) outputting a prompt instruction "the first steering motor fails, and the two-side steering-road-wheel independent steer-by-wire mode fails to be operated, please select another mode or repair the first steering motor in time";

(13) outputting a prompt instruction "the second steering motor fails, and the two-side steering-road-wheel independent steer-by-wire mode fails to be operated, please select another mode or repair the first steering motor in time";

(14) outputting a prompt instruction "the first steering motor and the second steering motor both fail, and the steering-trapezoidal steer-by-wire mode fails to be operated, please select another mode or repair the first steering motor and the second steering motor in time"; and

(15) ending mode switching and returning to step (1).

In some embodiments, the angle compensation and alignment subprogram is operated through steps of:

(a) turning off an electromagnetic valve at a side where a failed steering motor is located; or if the first steering motor and the second steering motor are both in normal operation, turning off an electromagnetic valve at a side with a smaller steering angle;

(b) reading an angle signal of wheels at the side where the failed steering motor is located or an angle signal of wheels at the side with a smaller steering angle; and calculating an angle of wheels at the other side according to a trapezoidal steering relationship;

(c) calculating a target angle control instruction for a steering electric motor mechanism at a side where a normal steering motor is located or at a side with a larger steering angle according to an angular transmission ratio of the steering electric motor mechanism;

(d) turning on an electromagnetic valve at the side where the normal steering motor is located or at the side with a larger steering angle;

(e) inputting the target angle control instruction to the steering electric motor mechanism at the side where the normal steering motor is located or at the side with a larger steering angle;

(f) determining whether the angle of wheels at the side where the normal steering motor is located or at the side with a larger steering angle is the same as the target angle control instruction; if no, returning to step (c); and (g) turning off the electromagnetic valve at the side where the normal steering motor is located or at the side with a larger steering angle; and ending the angle compensation and alignment subprogram.

In some embodiments, the subprogram for the two-side steering-road-wheel independent steer-by-wire mode is operated through steps of:

(a) disengaging an electromagnetic clutch;
(b) turning on a first electromagnetic valve and a second electromagnetic valve;
(c) reading an angle signal and a torque signal of a steering hand wheel;
(d) according to vehicle steering dynamics requirement and current vehicle state, generating an angle signal of a first steering road wheel and an angle signal of a second steering road wheel;
(e) according to an angular transmission ratio of a first steering electric motor mechanism, generating a first steering angle control instruction through calculation, and according to an angular transmission ratio of a second steering electric motor mechanism, generating a second steering angle control instruction through calculation;
(f) sending the first steering angle control instruction to the first steering motor, and sending the second steering angle control instruction to the second steering motor; and feeding a state signal of the first steering motor and a state signal of the second steering motor back to step (d); and
(g) allowing the first steering road wheel and the second steering road wheel to independently perform steering; feeding angle state signals of the first steering road wheel and the second steering road wheel respectively back to step (c); and ending the subprogram for the two-side steering-road-wheel independent steer-by-wire mode.

In some embodiments, the subprogram for the steering-trapezoidal steer-by-wire mode is operated through steps of:
(a) disengaging an electromagnetic clutch;
(b) turning off a first electromagnetic valve and a second electromagnetic valve;
(c) reading an angle signal and a torque signal of a steering hand wheel;
(d) generating a common steering angle signal for a first steering road wheel and a second steering road wheel according to vehicle steering dynamics requirement and current vehicle state;
(e) calculating a steering angle control instruction for a currently-effective steering electric motor mechanism according to an angular transmission ratio of the currently-effective steering electric motor mechanism;
(f) sending the steering angle control instruction to the currently-effective steering electric motor mechanism; and feeding a state signal of the first steering motor and a state signal of the second steering motor back to step (d); and
(g) allowing the first steering road wheel and the second steering road wheel to jointly perform steering with a steering-trapezoidal manner; and feeding angle state signals of the first steering road wheel and the second steering road wheel back to step (c).

In some embodiments, the subprogram for the electric power steering mode is operated through steps of:
(a) engaging an electromagnetic clutch;
(b) turning off a first electromagnetic valve and a second electromagnetic valve;
(c) reading an angle signal and a torque signal of a steering hand wheel;
(d) generating a steering-assisted power signal through table look-up according to current speed and the torque signal of the steering hand wheel;
(e) generating a current control instruction of a road-feeling motor according to the steering-assisted power signal and a speed ratio of a reducer of the road-feeling motor;
(f) transmitting the current control signal to the road-feeling motor; and feeding a state signal of the road-feeling motor back to step (d); and
(g) allowing the road-feeling motor to assist the drive to control two steering road wheels to complete steering with a steering-trapezoidal manner; feeding angle state signals of the two steering road wheels back to step (c); and ending the subprogram for the electric power steering mode.

Compared to the prior art, this application has the following beneficial effects.

Regarding the electric multi-mode steer-by-wire system, the two-side steering-road-wheel independent steer-by-wire mode, the steering-trapezoidal steer-by-wire mode and the electric power steering mode can be implemented. The two-side steering-road-wheel independent steer-by-wire mode and the steering-trapezoidal steer-by-wire mode are steer-by-wire mode, where the steering hand wheel and the steering road wheels are completely mechanically decoupled. The electric power steering mode is traditional electric power mechanical steering mode, that is, the steering hand wheel is mechanically connected to the steering execution unit and the steering road wheels.

Regarding the mode switching method of the electric multi-mode steer-by-wire system, the switching among three steering modes is automatically implemented when key components of the electric multi-mode steer-by-wire system fail, improving the redundancy safety, and enhancing continuous driving service capability under failure scenarios.

In addition, under normal driving conditions, manually controlled to achieve the switching among the three modes can be manually controlled by drivers for flexible steering of the vehicle, providing the drivers with more choices and greatly enriching driving pleasure.

Furthermore, a steering driving motor is coaxially integrated with the steering gear to reduce space occupied by the steering-by-wire mechanism, so as to provide space for other components on the vehicle.

Moreover, this application provides a display screen and its mode selector switch dedicated to steering state/fault information display to increase human-computer interaction capabilities and user decision-making authority.

BRIEF DESCRIPTION OF THE DRAWINGS

Technical solutions of the present disclosure will be described below with reference to the accompany drawings and embodiments to facilitate the understanding. Obviously, described below are merely some embodiments of the present disclosure, which are not intended to limit the disclosure.

Figure 1:
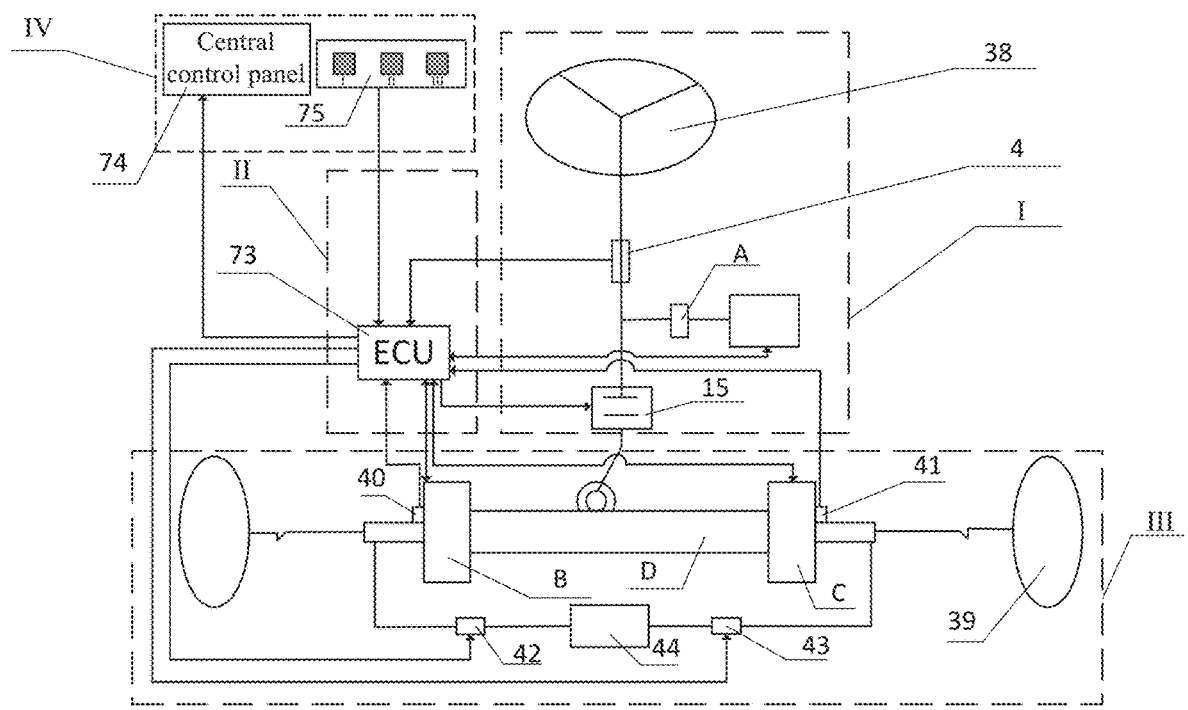
FIG. 1 is a structural block diagram of an electric multi-mode steer-by-wire system according to an embodiment of the present disclosure.

In the drawings, I, steering hand wheel unit; II, electronic control unit; III, steering execution unit; IV, mode selection and display unit; A, reducer; B, first steering electric motor mechanism; C, second steering electric motor mechanism; D, steering gear; 1, road-feeling motor; 2, upper reducer housing; 3, first deep groove ball bearing; 4, torque and angle sensor (TAS); 5, pin; 6, torsion bar; 7, steering drive shaft; 8, upper transmission shaft; 9, worm wheel; 10, lower reducer housing; 11, second deep groove ball bearing; 12, key; 13, spacer; 14, first steering universal joint; 15, electromagnetic clutch; 16, second steering universal joint; 17, lower transmission shaft; 18, third steering universal joint; 19, second bolt; 20, steering gear shaft; 21, rack; 22, steering gear housing; 23, third deep groove ball bearing; 24, first rotor; 25, fourth deep groove ball bearing; 26, first stator; 27, first lead screw; 28, first seal ring; 29, first rack bushing; 30, first bolt; 31, fifth deep groove ball bearing; 32, second rotor; 33, sixth deep groove ball bearing; 34, second stator; 35, second lead screw; 36, second seal ring; 37, second rack bushing; 38, steering hand wheel; 39, steering road wheel; 40, first lead screw position sensor; 41, second lead screw position sensor; 42, first electromagnetic valve; 43, second electromagnetic valve; 44, oil tank; 45, seventh deep groove ball bearing; 46, third bolt; 47, shaft coupling; 48, eighth deep groove ball bearing; 49, worm; 50, fourth bolt; 51, third end cover; 52, ninth deep groove ball bearing; 53, tenth deep groove ball bearing; 54, first nut; 55, second nut; 56, third seal ring; 57, rack support base; 58, adjustment screw plug; 59, spring; 60, gasket; 61, third nut; 62, seventh bolt; 63, first oil collar; 64, second oil collar; 65, fourth seal ring; 66, fifth seal ring; 67, fifth bolt; 68, sixth bolt; 69, first end cover; 70, second end cover; 71, first motor housing; 72, second motor housing; 73, electronic control unit (ECU) core part; 74, central control panel; and 75, mode selection button.

DETAILED DESCRIPTION OF EMBODIMENTS

Technical solutions of the present disclosure will be described below with reference to the accompany drawings and embodiments to facilitate the understanding. Obviously, described below are merely some embodiments of the present disclosure, which are not intended to limit the present disclosure. Other accompany drawings can be obtained by those skilled in the art based on the drawings provided herein without paying creative effort.

Referring to an embodiment illustrated in FIG. 1, an electric multi-mode steer-by-wire system includes a steering hand wheel unit I, an electronic control unit II, a steering execution unit III and a mode selection and display unit IV.

Figure 2:
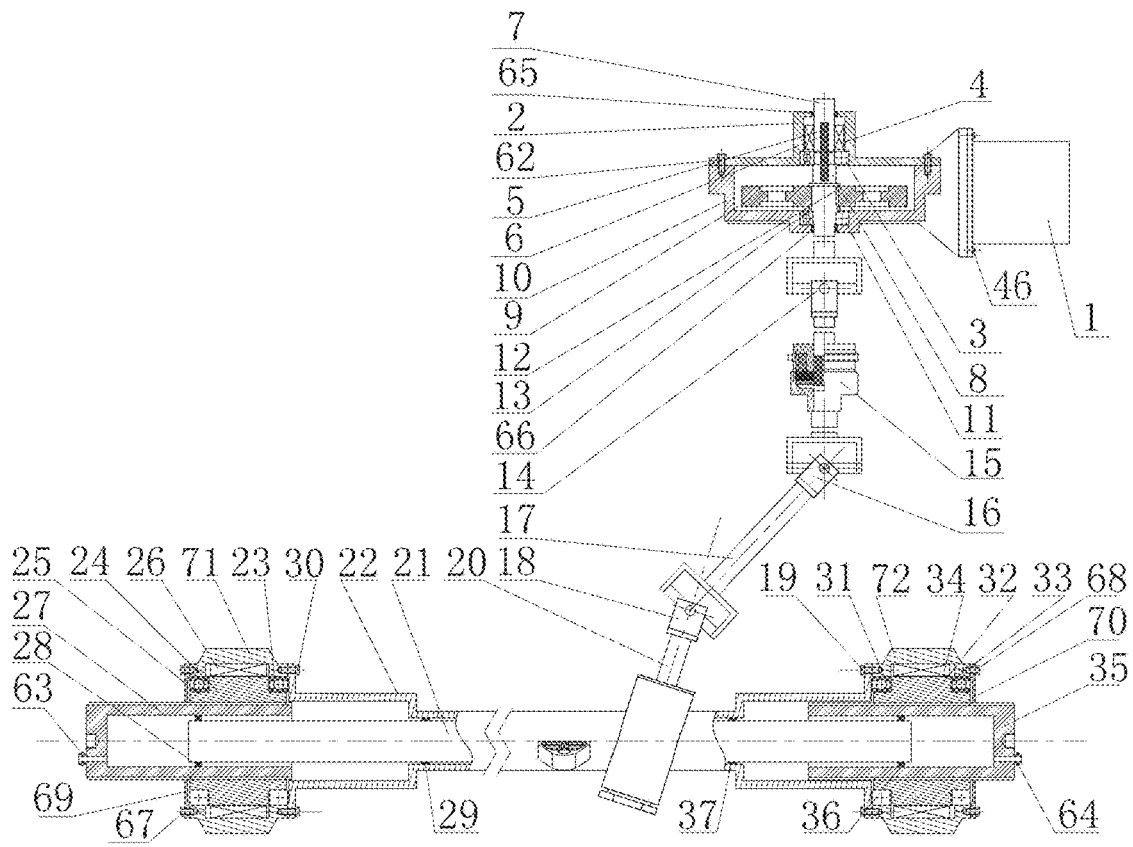
FIG. 2 schematically depicts a mechanical structure of the electric multi-mode steer-by-wire system according to an embodiment of the present disclosure.

As shown in FIG. 2, the steering hand wheel unit I includes a steering hand wheel 38, a torque and angle sensor (TAS) 4, a road-feeling motor 1, a reducer A of the road-feeling motor 1, an electromagnetic clutch 15, a torsion bar 6, a steering drive shaft 7, an upper transmission shaft 8, two pins 5, a first steering universal joint 14, a second steering universal joint 16 and a lower transmission shaft 17. The reducer A is a worm gear-worm reducer.

Figure 4:
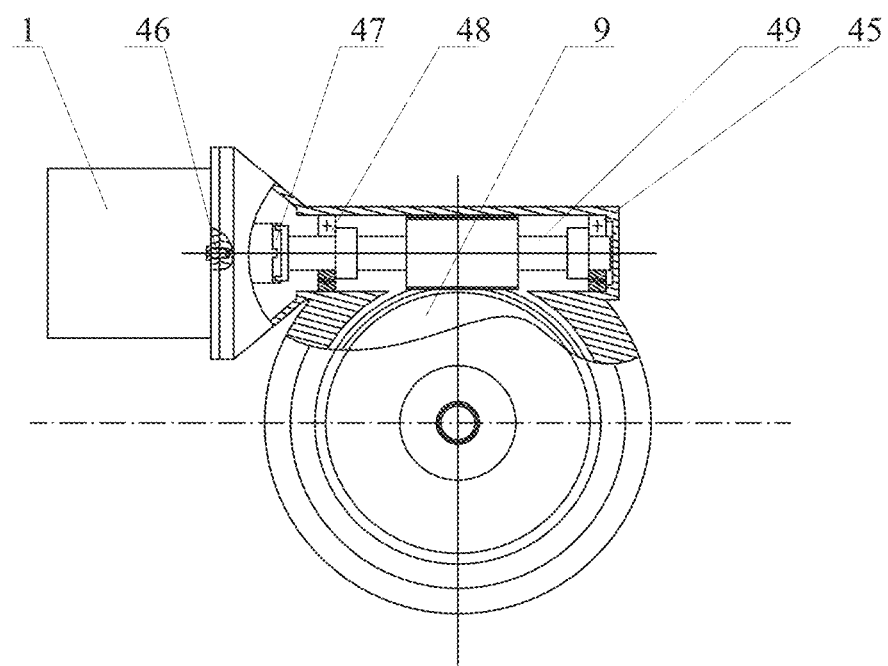
FIG. 4 schematically depicts a structure of a reducer of a road-feeling motor according to an embodiment of the present disclosure.

As shown in FIGS. 2 and 4, the reducer A includes a shaft coupling 47, a seventh deep groove ball bearing 45, an eighth deep groove ball bearing 48, a worm 49, a worm wheel 9, a first deep groove ball bearing 3, a second deep groove ball bearing 11, an upper reducer housing 2 and a lower reducer housing 10. An output shaft of the road-feeling motor 1 is connected to the worm 49 through the shaft coupling 47. The worm 49 is fixedly supported on the lower reducer housing 10 through the seventh deep groove ball bearing 45 and the eighth deep groove ball bearing 48. The worm wheel 9 is engaged with the worm 49 for transmission. The worm wheel 9 is connected to the upper transmission shaft 8 through a key 12. An upper end of the worm wheel 9 is limited through a stepped shaft. A lower end of the worm wheel 9 is limited through a spacer 13 and the second deep groove ball bearing 11. The upper transmission shaft 8 is fixedly supported on the upper reducer housing 2 through the first deep groove ball bearing 3, and on the lower reducer housing 10 through the second deep groove ball bearing 11.

As shown in FIG. 2, the road-feeling motor 1 is fixedly connected to the lower reducer housing 10 through a third bolt 46. The lower reducer housing 10 is fixedly connected to the upper reducer housing 2 through a seventh bolt 62. A lower end of the steering drive shaft 7 is sleevedly arranged on an upper end of the torsion bar 6. A gap is provided between the steering drive shaft 7 and the torsion bar 6 along radial direction. The upper transmission shaft 8 is sleevedly arranged on a lower end of the torsion bar 6. A gap is provided between the upper transmission shaft 8 and the torsion bar 6 along radial direction. The steering drive shaft 7 and the torsion bar 6 are connected through one of the two pins 5. The upper transmission shaft 8 and the torsion bar 6 are connected through the other of the two pins 5. Therefore, a torque of the steering drive shaft 7 is elastically transmitted to the upper transmission shaft 8 through the torsion bar 6, so as to provide relative torsional deformation to the TAS 4 to measure an input torque of the steering hand wheel 38. An upper end of the upper transmission shaft 8 is supported on an inner surface of the lower reducer housing 10. The road-feeling motor 1 is connected to the reducer A, and engaged with the steering drive shaft 7 for transmission. The TAS 4 is mounted on the steering drive shaft 7 to measure an input angle and input torque of the steering hand wheel 38. An upper end of the steering drive shaft 7 is connected to the steering hand wheel 38. The lower end of the steering drive shaft 7 is connected to the upper end of the upper transmission shaft 8 through the torsion bar 6. A lower end of the upper transmission shaft 8 is connected to a first end of the electromagnetic clutch 15 through the first steering universal joint 14. A second end of the electromagnetic clutch 15 is connected to the lower transmission shaft 17 through the second steering universal joint 16.

As shown in FIGS. 1 and 2, the steering execution unit III includes a pair of steering road wheels 39, a first steering electric motor mechanism B, a second steering electric motor mechanism C, a steering gear D, a first lead screw position sensor 40, a second lead screw position sensor 41, a first electromagnetic valve 42, a second electromagnetic valve 43 and an oil tank 44. A main body of each of the first steering electric motor mechanism B and the second steering electric motor mechanism C is composed of a coreless motor and a lead screw-nut motion conversion mechanism. The first steering electric motor mechanism B includes a first motor housing 71, a first stator 26, a first rotor 24, a first lead screw 27, a fifth bolt 67, a first end cover 69, a first oil collar 63, a first seal ring 28, a first bolt 30, a third deep groove ball bearing 23 and a fourth deep groove ball bearing 25. The second steering electric motor mechanism C includes a second motor housing 72, a second stator 34, a second rotor 32, a second lead screw 35, a sixth bolt 68, a second end cover 70, a second oil collar 64, a second seal ring 36, a second bolt 19, a fifth deep groove ball bearing 31 and a sixth deep groove ball bearing 33. The first seal ring 28 and the second seal ring 36 are O-shaped seal ring. The first motor housing 71 is connected to one end of the steering gear housing 22 through the first bolt 30. The second motor housing 72 is connected to the other end of the steering gear housing 22 through the second bolt 19. The first end cover 69 is connected to the first motor housing 71 through the fifth bolt 67. The second end cover 70 is connected to the second motor housing 72 through the sixth bolt 68. The first stator 26 is fixed at an inner surface of the first motor housing 71. The second stator 34 is fixed at an inner surface of the second motor housing 72. The first rotor 24 is supported on the first motor housing 71 through the third deep groove ball bearing 23 and the fourth deep groove ball bearing 25. The second rotor 32 is supported on the second motor housing 72 through the fifth deep groove ball bearing 31 and the sixth deep groove ball bearing 33. The first rotor 24 and the second rotor 32 each have an inner hollow threaded cylindrical surface. The first rotor 24 is connected to the first lead screw 27 through a sliding screw pair to convert rotation of the first rotor 24 to translation of the first lead screw 27. The second rotor 32 is connected to the second lead screw 35 through a sliding screw pair to convert rotation of the second rotor 32 to translation of the second lead screw 35. The first lead screw position sensor 40 is fixed at an outer end of the first end cover 69 of the first steering electric motor mechanism B to measure retract distance of the first lead screw 27 passed through a center hole. The second lead screw position sensor 41 is fixed at an outer end of the second end cover of the second end cover 70 of the second steering electric motor mechanism C to measure retract distance of the second lead screw 35 passed through the center hole. Such that an actual angle of the steering road wheels 39 is calculated according to a transmission ratio of a wheel steering transmission mechanism. An outer end of the first lead screw 27 and that of the second rotor 32 each have a threaded hole to mount a ball pin, so as to drive the steering road wheels 39 to deflect jointly or individually by means of a connection between a steering tie rod with a steering knuckle arm ball head of the steering road wheels 39, such that the translation of the first lead screw 27 and that of the second rotor 32 are converted to rotation of the two steering road wheels 39 around a main pin. The first lead screw 27 and the second rotor 35 each have hollow structure, and respectively connected to two ends of the steering gear D to form a lockable hydraulic chamber (hydraulic cylinder) filled with hydraulic oil. The two ends of the steering gear D are respectively sealed by the first seal ring 28 and the second seal ring 36. The outer end of the first lead screw 27 is provided with an oil hole to fixedly arrange the first oil collar 63. An outer end of the second lead screw 35 is provided with an oil hole to screwedly fix the second oil collar 64. The hydraulic chamber of the first lead screw 27 is connected to the oil tank 44 through an oil pipe by means of the first oil collar 63, and the first electromagnetic valve 42 is provided therebetween. The hydraulic chamber of the second rotor 35 is connected to the oil tank 44 through an oil pipe by means of the second oil collar 64, and the second electromagnetic valve 43 is provided therebetween. The first electromagnetic valve 42 and the second electromagnetic valve 43 are respectively configured to control communication of the hydraulic chamber of the first lead screw 27 and the hydraulic chamber of the second rotor 35 with the oil tank 44, so as to control connection of the first lead screw 27 and the second rotor 35 with two ends of the steering gear D, respectively.

Figure 3:
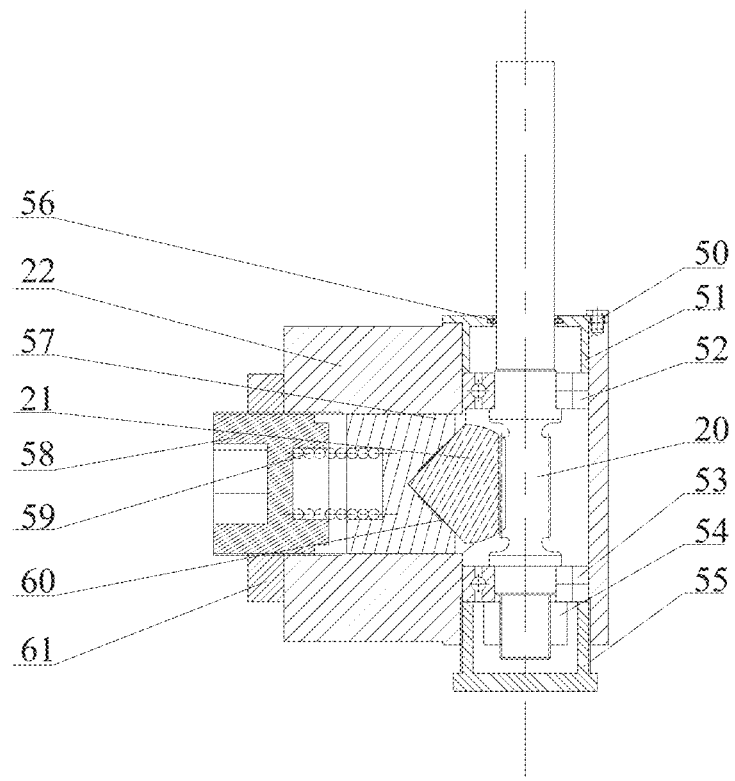
FIG. 3 structurally depicts a steering gear according to an embodiment of the present disclosure.

As shown in FIG. 3, the steering gear D includes a fourth bolt 50, a third end cover 51, a ninth deep groove ball bearing 52, a tenth deep groove ball bearing 53, a first nut 54, a second nut 55, a third seal ring 56, a rack support base 57, a first rack bushing 29, a second rack bushing 37, an adjustment screw plug 58, a spring 59, a gasket 60, a third nut 61, a steering gear shaft 20, a rack 21 and a steering gear housing 22. A middle portion of the steering gear shaft 20 is provided with a pinion. The steering gear shaft 20 is mounted on an inner wall of the steering gear housing 22 through the ninth deep groove ball bearing 52 and the tenth deep groove ball bearing 53. An upper end of the steering gear shaft 20 is mechanically connected to the lower transmission shaft 17 through a third steering universal joint 18 to transmit a steering torque. The third end cover 51 is fixedly connected to the steering gear housing 22 through the fourth bolt 50 to limit the ninth deep groove ball bearing 52. The third seal ring 56 is arranged between the third end cover 51 and the steering gear shaft 20 to achieve sealing of lubricating greases inside the steering gear D. The first nut 54 is connected to the steering gear shaft 20 through a screw thread pair to lock the tenth deep groove ball bearing 53 arranged on the steering gear shaft 20. The second nut 55 is connected to the steering gear housing 22 through a screw thread pair to screwedly limit the tenth deep groove ball bearing 53. One end of the steering gear housing 22 is boltedly connected to the first motor housing 71, and the other end of the steering gear housing 22 is boltedly connected to the second motor housing. The rack 21 is engaged with the steering gear shaft 20 for transmission, and is connected to the steering gear housing 22 through the first rack bushing 29, the second rack bushing 37 and the rack support base 57 for support and guidance. One end of the rack 21 is inserted into the first lead screw 27 to form the hydraulic chamber of the first lead screw 27 through the first seal ring 28, and the other end of the rack 21 is inserted into the second lead screw 35 to form the hydraulic chamber of the second lead screw 35 through the second seal ring 36. When hydraulic oil in the hydraulic chambers is sealed inside, the rack 21 is synergistically driven with the first lead screw 27 and the second lead screw 35. Otherwise, the rack 21 can independently move with respect to the first lead screw 27 and the second lead screw 35. In an embodiment, the gasket 60 is arranged between the rack 21 and the rack support base 57 to reduce motion friction therebetween. The adjustment screw plug 58 is screwedly connected to a side wall of the steering gear housing 22 below the rack support base 57. One end of the spring 59 is arranged at a top surface slot of the adjustment screw plug 58, and the other end of the spring 59 is arranged at a top surface slot of the rack support base 57, so as to press the rack support base 57 and eliminate transmission clearance. The third nut 61 is screwedly connected to a lower end of the adjustment screw plug 58.

Figure 5:
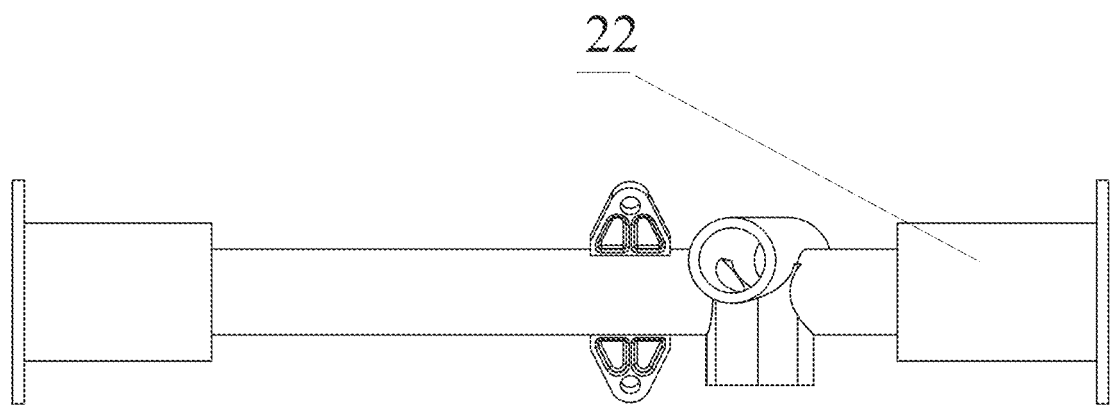
FIG. 5 schematically depicts a structure of a steering gear housing according to an embodiment of the present disclosure.

As shown in FIGS. 1, 2 and 5, the steering gear housing 22 is a cast aluminum housing with two thick ends and a thin middle portion. The middle portion of the steering gear housing 22 is configured to accommodate parts of the steering gear D. One end of the steering gear housing 22 is coaxially connected to the first motor housing through the first bolt 30 to provide space for retraction of the first lead screw 27, and the other end of the steering gear housing 22 is coaxially connected to the second motor housing 72 through the second bolt 19 to form a chamber to provide space for retraction of the second lead screw 35.

Regarding the electronic control unit II, an ECU core part 73 is connected to the road-feeling motor 1, the TAS 4, the electromagnetic clutch 15, the first lead screw position sensor 40, the second lead screw position sensor 41, the first electromagnetic valve 42, the second electromagnetic valve 43, the first steering electric motor mechanism B and the second steering electric motor mechanism C through a signal wire, respectively. The ECU core part 73 is configured to receive a torque-angle signal of the steering hand wheel 38 collected by the TAS 4, so as to determine steering intention of the driver. The ECU core part 73 is configured to receive a signal from the first lead screw position sensor 40 and a signal from the second lead screw position sensor 41, acquire an actual steering angle signal of the steering road wheels 39, and correct an electric motor operating signal according to the torque-angle signal of the steering hand wheel 38, so as to correct an actual steering angle of the steering road wheels 39. The ECU core part 73 is configured to send a clutch control signal to the electromagnetic clutch 15 for controlling, so as to control a mechanical connection between the steering hand wheel unit I and the electronic control unit II. The ECU core part 73 is configured to send a corresponding motor operating signal to the road-feeling motor 1, the first steering electric motor mechanism B and the second steering electric motor mechanism C, respectively, to control operation state and torque output of the road-feeling motor 1, the first steering electric motor mechanism B and the second steering electric motor mechanism C. Meanwhile, the road-feeling motor 1, the first steering electric motor mechanism B and the second steering electric motor mechanism C are configured to feed a real-time operation state signal including speed and torque to the ECU core part 73. Consequently, the ECU core part 73 realizes a loop regulatory control to the road-feeling motor 1, the first steering electric motor mechanism B and the second steering electric motor mechanism C.

The mode selection and display unit IV includes three mode selection buttons 75 and a central control panel 74. The three mode selection buttons 75 can be pushed by the driver to send a signal to the ECU core part 73 to select a steering mode. The three mode selection buttons 75 includes a first mode selection button, a second mode selection button and a third mode selection button. When the first mode selection button is pushed by the driver, the electric multi-mode steer-by-wire system operates under a two-side steering-road-wheel independent steer-by-wire mode; when the second mode selection button is pushed by the driver, the electric multi-mode steer-by-wire system operates under a steering-trapezoidal steer-by-wire mode; and when the third mode selection button is pushed by the driver, the electric multi-mode steer-by-wire system operates under an electric power steering mode. If none of the three mode selection buttons 75 is pushed, a manual driving mode selection state is turned off. An operation state and fault information of the ECU core part 73 are displayed on the central control panel 74 through controller area network (CAN) communication.

Regarding the electric multi-mode steer-by-wire system provided herein, The switching among the two-side steering-road-wheel independent steer-by-wire mode, the steering-trapezoidal steer-by-wire mode and the electric power steering mode is automatically controlled by the electronic control unit II or manually performed through the three mode selection buttons in the mode selection and display unit IV according to the vehicle dynamics state and a fault failure state of the steering execution unit. The two-side steering-road-wheel independent steer-by-wire mode and the steering-trapezoidal steer-by-wire mode both steer-by-wire mode, where the steering hand wheel and the steering road wheels are completely mechanical decoupling. The two-side steering-road-wheel independent steer-by-wire mode is distributed steer-by-wire mode. The steering-trapezoidal steer-by-wire mode is traditional steer-by-wire mode. The electric power steering mode is traditional electric power-assisted mechanical steering mode, that is, the steering hand wheel is mechanically connected to the steering execution unit and the steering road wheels. The steering-trapezoidal steer-by-wire mode and the electric power steering mode play a fail-to-safe backup role for the two-side steering-road-wheel independent steer-by-wire mode. The electric power steering mode plays a fail-to-safe backup for the steering-trapezoidal steer-by-wire mode. Such that, the reliability of the electric multi-mode steer-by-wire system is greatly improved.

Figure 6:
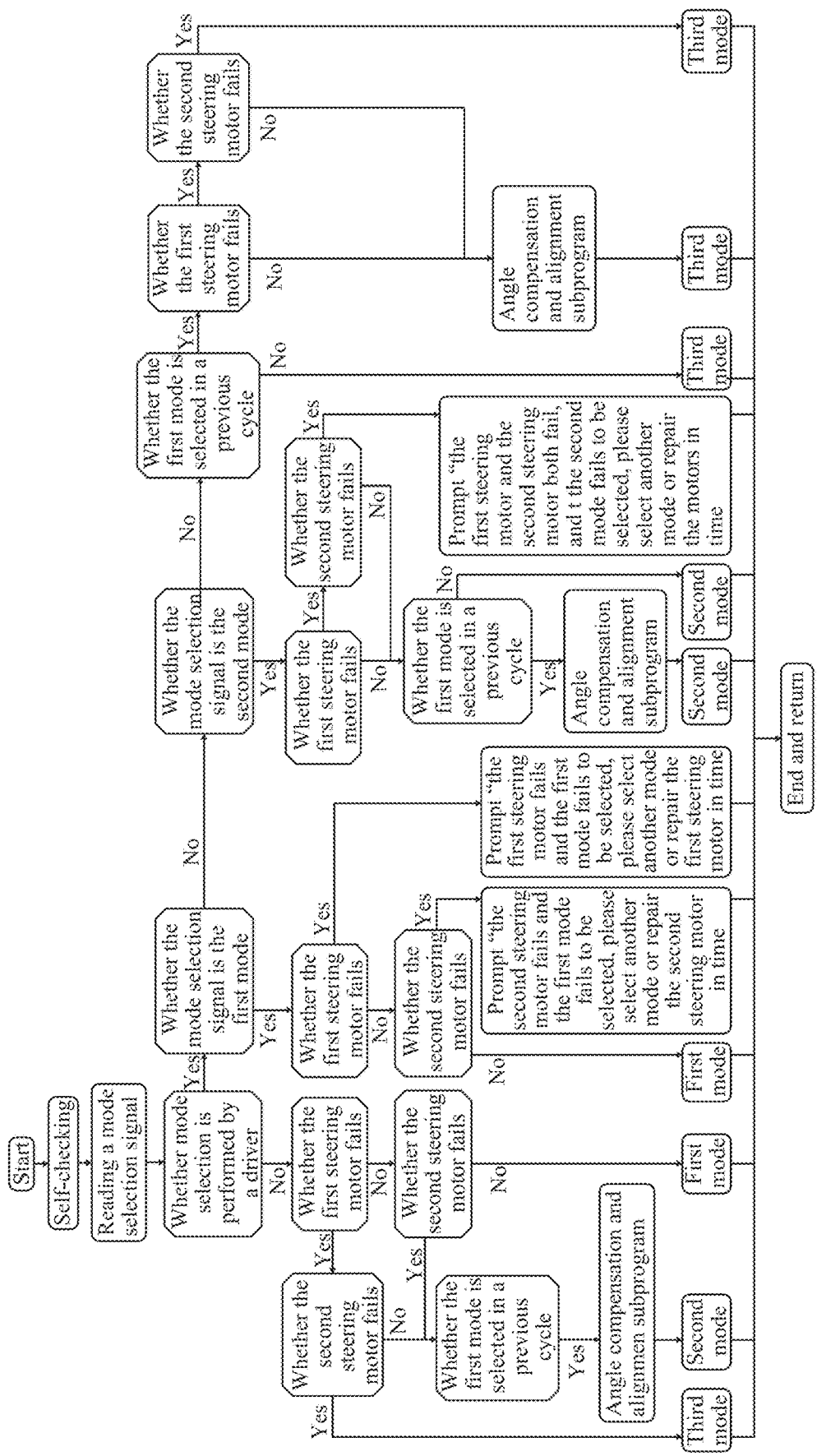
FIG. 6 is a flow chart of a mode switching main program for the electric multi-mode steer-by-wire system according to an embodiment of the present disclosure.

The electronic control unit II stores a mode switching method of the electric multi-mode steer-by-wire system. A main program for the mode switching method shown in FIG. 6, including:

(1) allowing the electric multi-mode steer-by-wire system to perform self-checking; and recording an operation state of a first steering motor and a second steering motor;

(2) reading status of a mode selection signal;

(3) determining whether a driver performs mode selection; if no, proceeding to step (6);

(4) determining whether the mode selection signal is selection of a two-side steering-road-wheel independent steer-by-wire mode; if yes, proceeding to step (6);

(5) determining whether the mode selection signal is selection of a steering-trapezoidal steer-by-wire mode; if no, proceeding to step (7);

(6) according to the operation state of the first steering motor and the second steering motor, and the status of the mode selection signal, determining whether the first steering motor and the second steering motor fail;

if the first steering motor and the second steering motor are both in normal operation, and the mode selection signal is OFF or is selection of the two-side steering-road-wheel independent steer-by-wire mode, proceeding to step (8);

if the first steering motor or the second steering motor does not fail, and the mode selection signal is OFF, or is selection of the steering-trapezoidal steer-by-wire mode, proceeding to step (7);

if the first steering motor and the second steering motor both fail, and the mode selection signal is OFF, proceeding to step (10);

if the first steering motor and the second steering motor both fail, and the mode selection signal is selection of the steering-trapezoidal steer-by-wire mode, proceeding to step (14);

if only the first steering motor fails, and the mode selection signal is selection of the two-side steering-road-wheel independent steer-by-wire mode, proceeding to step (12); and if only the second steering motor fails, and the mode selection signal is selection of the two-side steering-road-wheel independent steer-by-wire mode, proceeding to step (13);

(7) determining whether the two-side steering-road-wheel independent steer-by-wire mode is selected in a previous cycle;

if yes, and the mode selection signal is not selection of an electric power steering mode, proceeding to step (11) and then to step (9);

if no, and the mode selection signal is not selection of the electric power steering mode, proceeding to step (9);

if yes, and the mode selection signal is selection of the electric power steering mode, proceeding to step (11) and then to step (10); and if no, and the mode selection signal is selection of the electric power steering mode, proceeding to step (10);

(8) operating a subprogram for the two-side steering-road-wheel independent steer-by-wire mode;

(9) operating a subprogram for the steering-trapezoidal steer-by-wire mode;

(10) operating a subprogram for the electric power steering mode;

(11) operating an angle compensation and alignment subprogram;

(12) outputting a prompt instruction "the first steering motor fails, and the two-side steering-road-wheel independent steer-by-wire mode fails to be operated, please select another mode or repair the first steering motor in time";

(13) outputting a prompt instruction "the second steering motor fails, and the two-side steering-road-wheel independent steer-by-wire mode fails to be operated, please select another mode or repair the first steering motor in time";

(14) outputting a prompt instruction "the first steering motor and the second steering motor both fail, and the steering-trapezoidal steer-by-wire mode fails to be operated, please select another mode or repair the first steering motor and the second steering motor in time"; and

(15) ending mode switching and returning to step (1).

In an embodiment, when the steering-trapezoidal steer-by-wire mode is selected, and the previous loop is the two-side steering-road-wheel independent steer-by-wire mode, the main program is operated through steps of:

performing step (1);
performing step (2);
performing step (3), where it is determined that the mode selection is performed;
performing step (4), where it is determined that the two-side steering-road-wheel independent steer-by-wire mode (first mode) is not selected;
performing step (5), where it is determined that the steering-trapezoidal steer-by-wire mode (second mode) is selected;
performing step (6) and then proceeding to step (7);
performing step (7), where it is determined that what is used in the previous cycle is the two-side steering-road-wheel independent steer-by-wire mode;
performing step (11);
performing step (9); and
ending main program, followed by returning to step (1).

Figure 7:
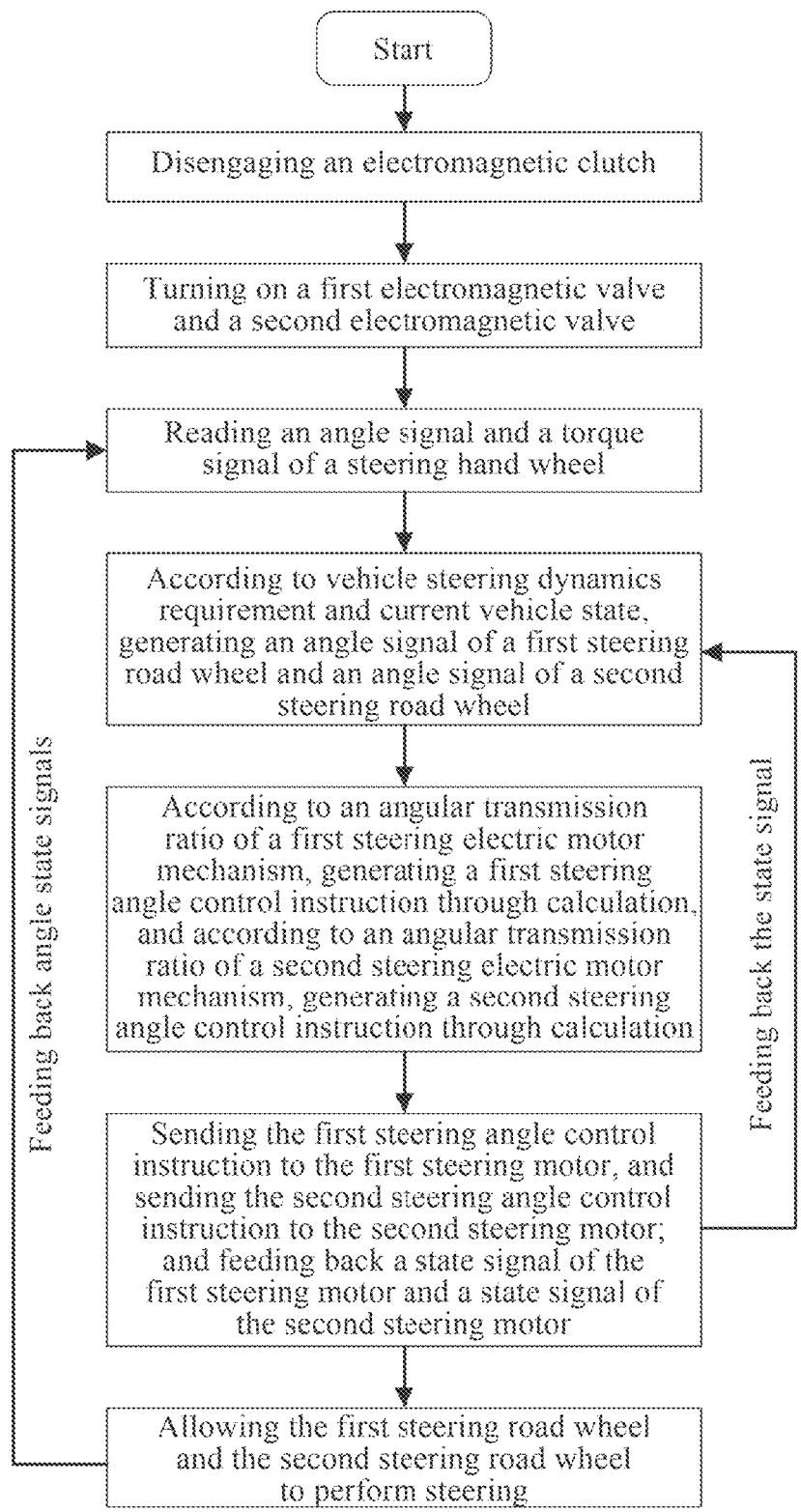
FIG. 7 is a flow chart of a subprogram for a two-side steering-road-wheel independent steer-by-wire mode in the mode switching method according to an embodiment of the present disclosure.

The execution process of the subprogram for the two-side steering-road-wheel independent steer-by-wire mode is shown in FIG. 7, including:

(a) disengaging an electromagnetic clutch;
(b) turning on a first electromagnetic valve and a second electromagnetic valve;
(c) reading, by an electronic control unit (ECU), an angle signal and a torque signal of a steering hand wheel;
(d) according to vehicle steering dynamics requirement and current vehicle state, generating, by the ECU, an angle signal of a first steering road wheel and an angle signal of a second steering road wheel;
(e) according to an angular transmission ratio of a first steering electric motor mechanism, generating a first steering angle control instruction through calculation, and according to an angular transmission ratio of a second steering electric motor mechanism, generating a second steering angle control instruction through calculation;
(f) sending the first steering angle control instruction to the first steering motor, and sending the second steering angle control instruction to the second steering motor; and feeding a state signal of the first steering motor and a state signal of the second steering motor back to step (d); and
(g) allowing the first steering road wheel and the second steering road wheel to independently perform steering; feeding angle state signals of the first steering road wheel and the second steering road wheel respectively back to step (c); and ending the subprogram for the two-side steering-road-wheel independent steer-by-wire mode.

Figure 8:
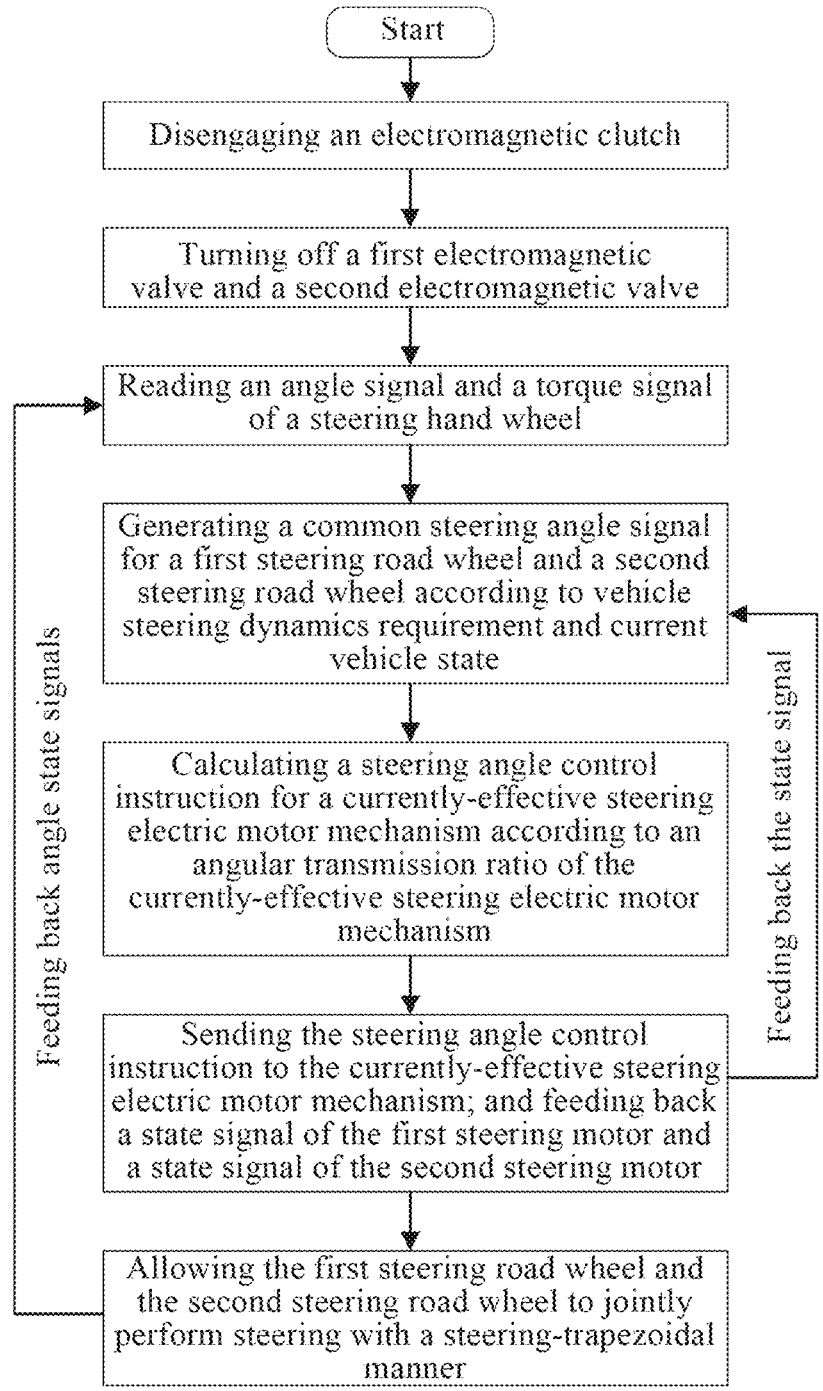
FIG. 8 is a flow chart of a subprogram for a steering-trapezoidal steer-by-wire mode in the mode switching method according to an embodiment of the present disclosure.

The execution process of the subprogram for the steering-trapezoidal steer-by-wire mode is shown in FIG. 8, including:

(a) disengaging an electromagnetic clutch;
(b) turning off a first electromagnetic valve and a second electromagnetic valve;
(c) reading, by an ECU, an angle signal and a torque signal of a steering hand wheel;
(d) generating, by the ECU, a common steering angle signal for a first steering road wheel and a second steering road wheel according to vehicle steering dynamics requirement and current vehicle state;
(e) calculating a steering angle control instruction for a currently-effective steering electric motor mechanism (under normal operation) according to an angular transmission ratio of the currently-effective steering electric motor mechanism;
(f) sending the steering angle control instruction to the currently-effective steering electric motor mechanism; if two steering electric motor mechanisms are both normal, determining whether only one steering electric motor mechanism is to drive, or two steering electric motor mechanisms are both to drive according to a steering resistance load; and feeding, by the effective steering electric motor mechanism, a state signal of the first steering motor and a state signal of the second steering motor back to step (d); and
(g) allowing the first steering road wheel and the second steering road wheel to jointly perform steering with a steering-trapezoidal manner; and feeding angle state signals of the first steering road wheel and the second steering road wheel back to step (c).

Figure 9:
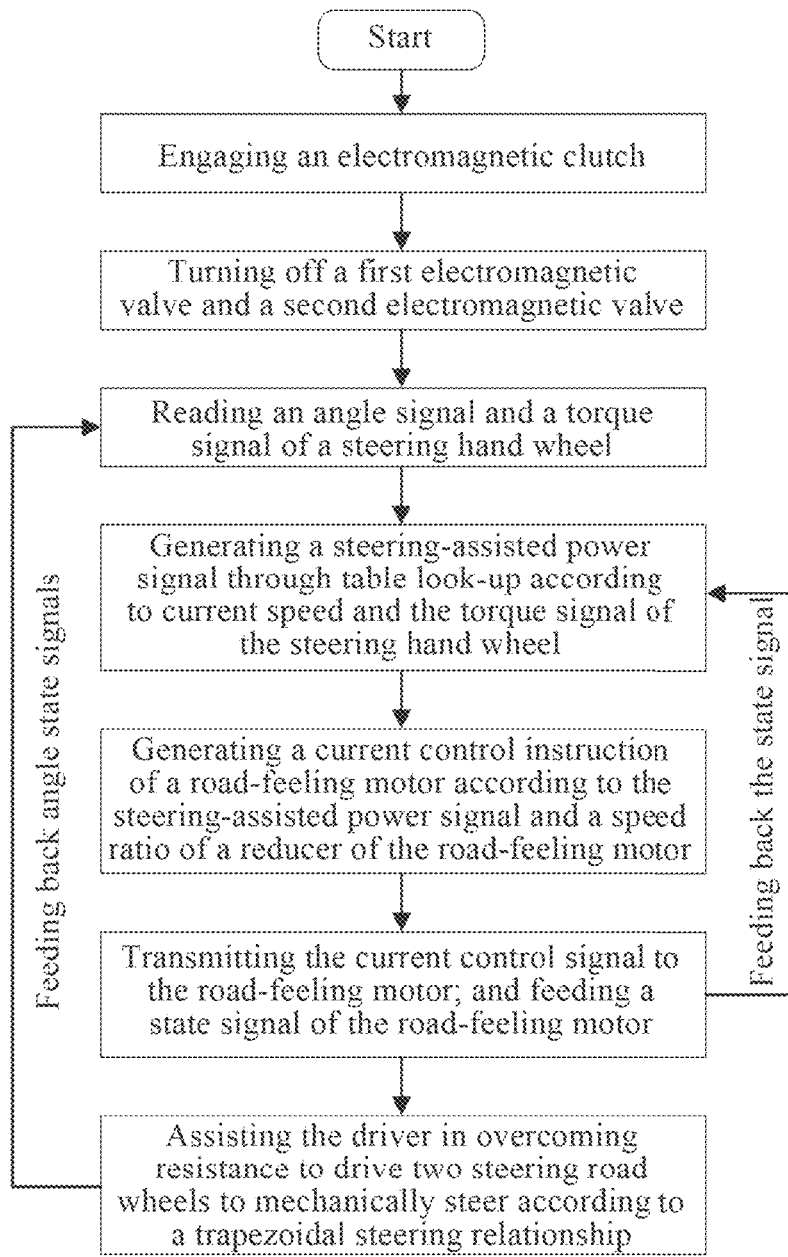
FIG. 9 is a flow chart of a subprogram for an electric power steering mode in the mode switching method according to an embodiment of the present disclosure.

The execution process of the subprogram for the electric power steering mode is shown in FIG. 9, including:

(a) engaging an electromagnetic clutch;
(b) turning off a first electromagnetic valve and a second electromagnetic valve;
(c) reading, by an ECU, an angle signal and a torque signal of a steering hand wheel;
(d) generating, by the ECU, a steering-assisted power signal through table look-up according to current speed and the torque signal of the steering hand wheel;
(e) generating a current control instruction of a road-feeling motor according to the steering-assisted power signal and a speed ratio of a reducer of the road-feeling motor;
(f) transmitting the current control signal to the road-feeling motor to generate a power-assisted torque; and feeding, by the road-feeling motor, a state signal of the road-feeling motor back to step (d); and
(g) driving, by controlling the steering hand wheel, the two steering road wheels to mechanical steering under assistance of the road-feeling motor according to a trapezoidal steering relationship; feeding angle state signals of the two steering road wheels back to step (c); and ending the subprogram for the electric power steering mode.

Figure 10:
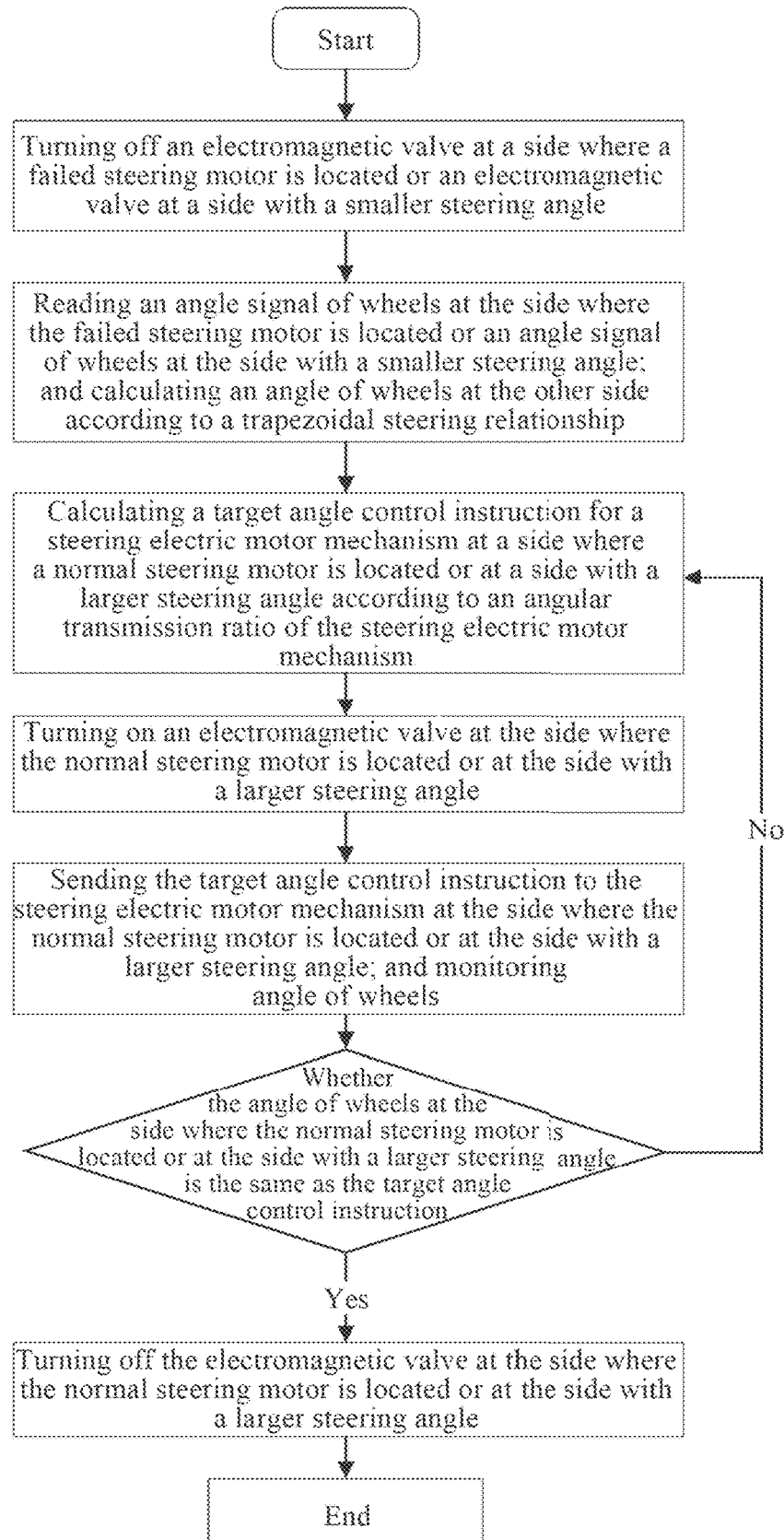
FIG. 10 is a flow chart of an angle compensation and alignment subprogram in the mode switching method according to an embodiment of the present disclosure.

The execution process of the angle compensation alignment subprogram is shown in FIG. 10, including:

(a) turning off an electromagnetic valve at a side where a failed steering motor is located; or if the first steering motor and the second steering motor are both in normal operation, turning off an electromagnetic valve at a side with a smaller steering angle;
(b) reading, by an ECU, an angle signal of wheels at the side where the failed steering motor is located or an angle signal of wheels at the side with a smaller steering angle; and calculating an angle of wheels at the other side according to a trapezoidal steering relationship;
(c) calculating a target angle control instruction for a steering electric motor mechanism at a side where a normal steering motor is located or at a side with a larger steering angle according to an angular transmission ratio of the steering electric motor mechanism;
(d) turning on an electromagnetic valve at the side where the normal steering motor is located or at the side with a larger steering angle;
(e) inputting the target angle control instruction to the steering electric motor mechanism at the side where the normal steering motor is located or at the side with a lar1ger steering angle;
(f) determining whether the angle of wheels at the side where the normal steering motor is located or at the side with a larger steering angle is the same as the target angle control instruction; if no, returning to step (c); or if yes, proceeding to step (g) and
(g) turning off the electromagnetic valve at the side where the normal steering motor is located or at the side with a larger steering angle; and ending the angle compensation and alignment subprogram.

Regarding the electric multi-mode steer-by-wire system and the mode switching method thereof, operating principle for three operating modes and switching method thereof is as follows.

(1) Regarding the two-side steering-road-wheel independent steer-by-wire mode, the driver rotates the steering hand wheel, such that a steering operation signal is generated. The TAS detects and collects the torque-angle signal of the steering hand wheel, and then send to the ECU core part 73. The ECU core part 73 receives the torque-angle signal of the steering hand wheel and processes to input the electric motor operating signal. The electric motor operating signal is sent to the first steering electric motor mechanism B and the second steering electric motor mechanism C by the ECU core part 73, such that the first rotor 24 and the second rotor 32 can respectively output a drive torque. The drive torque is transformed to a drive force to make translation of lead screw by the sliding screw pair, and swing the two steering road wheels through the steering tie rod and the steering knuckle arm. In this time, the first electromagnetic valve 42 and the second electromagnetic valve 43 are in turn-on state, such that two hydraulic chambers are communicated with the oil tank 44. A linear thrust of the lead screw can make hydraulic oil circulate freely between the two hydraulic chambers and the oil tank 44, so as to ensure the first lead screw 27 and the second lead screw 35 can move independently without resistance for steer-by-wire independent steering. This mode operates when the electric multi-mode steer-by-wire system operates normally.

At this time, the ECU core part 73 receives signals from the first lead screw position sensor 40 and the first lead screw position sensor 41, acquires the actual steering signal of the steering road wheels, and corrects the electric motor operating signal according to the torque-angle signal of the steering hand wheel, so as to correct an actual steering of the steering road wheels. The road-feeling motor 1, the first steering electric motor mechanism B and the second steering electric motor mechanism C feed the real-time operation state signal including speed and torque to the ECU core part 73. Consequently, the ECU core part 73 is capable of a loop regulatory control to the road-feeling motor 1, the first steering electric motor mechanism B and the second steering electric motor mechanism C.

As shown in FIG. 1, when the steering road wheels implement normal steer-by-wire independent steering, the ECU core part 73 receives and processes rode information, and then inputs a road-feeling motor operating signal to the road-feeling motor 1. The road-feeling motor 1 is controlled to input a road feeling simulation torque into the reducer A. In the reducer A, an output end of the road-feeling motor 1 drives the worm 49 to rotate. The worm 49 drives the worm wheel 9 to rotate, so as to rotate the upper transmission shaft 8, and sequentially drive the torsion bar 6, the steering drive shaft 7 and the steering hand wheel 38 to rotate. In consequence, a road simulation signal represented by the road feeling simulation torque is fed back to the driver through the steering hand wheel to make road feeling simulation.

In addition, as shown in FIG. 1, when the steering road wheels implement normal steer-by-wire independent steering, the ECU core part 73 controls the electromagnetic clutch to be turned off, so as to make no mechanical connection between the steering hand wheel unit I and the steering execution unit III.

The two-side steering-road-wheel independent steer-by-wire mode at normal operation is switched to the steering-trapezoidal steer-by-wire mode at failed backup.

During steering, if a steering motor is broken, the two-side steering-road-wheel independent steer-by-wire mode will be switched to the steering-trapezoidal steer-by-wire mode. Due to the two-side steering-road-wheel independent steer-by-wire mode, the steering road wheels are independently controllable, and a steering angle difference therebetween may be large. During failure, it is necessary to switch to the steering-trapezoidal steer-by-wire mode as a backup. At this time, the steering angles of the steering road wheels require to strictly meet the steering angle relation determined by the steering trapezium. Therefore, in the process of switching, the steering angle of each steering road wheel is adjusted to switch from independent steering to steering-trapezoidal manner. Specifically, when one steering electric motor mechanism fails, the electromagnetic valve thereof is turned off. The electromagnetic valve of the normal steering electric motor mechanism is turned on. The steering angle of the failed steering road wheel is calculated according to the lead screw position sensor of the failed steering electric motor mechanism, and take as standard. The steering angle of the normal steering road wheel is calculated through steering trapezium, and is adjusted through the normal steering electric motor mechanism. When a target steering angle is reached, the electromagnetic valve of the normal steering electric motor mechanism is turned off, and the switching process is completed.

(2) Regarding the steering-trapezoidal steer-by-wire mode, when only one of the first steering electric motor mechanism B and the second steering electric motor mechanism C is normal, the electric multi-mode steer-by-wire system enters the steering-trapezoidal steer-by-wire mode. At this time, the driver rotates the steering hand wheel, such that a steering operation signal is generated. The TAS detects and collects the torque-angle signal of the steering hand wheel, and then send to the ECU core part 73. The ECU core part 73 receives the torque-angle signal of the steering hand wheel and processes to input the electric motor operating signal. The electric motor operating signal is sent to the effective steering electric motor mechanism by the ECU core part 73, such that the effective motor rotor can output a drive torque. The drive torque is transformed to a drive force to make translation of lead screw by the sliding screw pair, and swing the two steering road wheels through the steering tie rod and the steering knuckle arm. In this time, the first electromagnetic valve 42 and the second electromagnetic valve 43 are in turn-off state, such that the first lead screw 27 and the second lead screw 35 are fixedly connected to the rack 21 due to incompressibility of hydraulic oil. The effective steering electric motor mechanism transmit the drive force to the failed steering electric motor mechanism to swing two steering road wheels, so as to realize a failed backup steering process.

Particularly, when a normal operation switches to a failed backup operation, due to the two-side steering-road-wheel independent steer-by-wire mode of the normal operation, and steering-trapezoidal geometric steering law of the steering-trapezoidal steer-by-wire mode of the failed backup operation, a steering angle of outer wheel under these two modes is usually different even the inner wheel under these two modes has the same steering angle. Therefore, during switching, a failed electromagnetic valve should be turned off. According to a steering angle of the steering road wheel in the failed side, the steering road wheel in the normal side is adjusted through the steering-trapezoidal geometric relation, so as to satisfy the steer-by-wire trapezoidal steering under failure scenarios.

Under the steering-trapezoidal steer-by-wire mode, the ECU core part 73 controls the electromagnetic valve to be turned off, so as to make no mechanical connection between the steering hand wheel unit I and the steering execution unit III.

The steering-trapezoidal steer-by-wire mode at failed backup is switched to the electric power steering mode at complete failure scenarios.

(3) Since the steering-trapezoidal steer-by-wire mode and the traditional electric power steering mode both satisfy the steering-trapezoidal geometric relation, it is only necessary to turn on the electromagnetic clutch and use the road-feeling motor as a steering assist motor.

When the first steering electric motor mechanism B and that of the second steering electric motor mechanism C are both failed, the electric multi-mode steer-by-wire system switches to the electric power steering mode, which is the general steering method for vehicles at present. The ECU core part 73 controls the electromagnetic clutch 15 to be turned on, such that a steering hand wheel-steering rod system, which consists of the steering hand wheel 38, the steering drive shaft 7, the torsion bar 6 and the upper transmission shaft 8 connected in sequence, is mechanically connected to the steering gear shaft 20 through the electromagnetic clutch 15 and the steering gear D. The driver can operate the steering hand wheel 38, and the driving torque is output through the steering hand wheel-steering rod system under a rotational assistance of the reducer A. Then, due to the steering trapezium consisting of the steering gear, steering tie rod and steering knuckle arm, the steering execution unit III including the steering gear pushes the steering road wheels to steer according to the trapezoidal geometric relation. At this time, the first electromagnetic valve 42 and the first electromagnetic valve are turned off, that is, the first lead screw 27 and the second lead screw 35 are fixedly connected to the rack 21 due to incompressibility of hydraulic oil, and a steering driving torque of the steering road wheels is transformed to a force pushing the steering road wheels to steer through a pinion-rack transmission pair, such that the steering-trapezoidal manner of the steering road wheels is realized.

Particularly, in the case that the two steering electric motor mechanisms both fail, the two electromagnetic valves are turned off and the electromagnetic clutch 15 is disengaged simultaneously, and the road-feeling motor plays a role as an assisted motor. Under this dangerous condition, the design proposed herein can still keep the vehicle controllable.

What is claimed is:

1. An electric multi-mode steer-by-wire system, comprising:
    a steering hand wheel unit, configured to be manipulated by a driver to input a steering action;
    a steering execution unit, configured to perform a wheel steering action;
    a mode selection and display unit, configured for manual steering mode selection and state display; and
    an electronic control unit, configured to receive a state signal and send a control instruction;
    wherein the steering hand wheel unit comprises a steering hand wheel, a torque and angle sensor (TAS), a road-feeling motor, a reducer for the road-feeling motor, an electromagnetic clutch, a torsion bar, a steering drive shaft, an upper transmission shaft, two pins, a first steering universal joint, a second steering universal joint, a lower transmission shaft and a third steering universal joint; and the reducer is a worm gear-worm reducer;
    the steering execution unit comprises a pair of steering road wheels, a first steering electric motor mechanism, a second steering electric motor mechanism, a steering gear, a first lead screw position sensor, a second lead screw position sensor, a first electromagnetic valve, a second electromagnetic valve and an oil tank; an upper end of the steering gear is connected to the steering hand wheel unit; a first lateral end of the steering gear is connected to the first steering electric motor mechanism, and a second lateral end of the steering gear is connected to the second steering electric motor mechanism; the first steering electric motor mechanism is connected to the one of the pair of steering road wheels through a first steering tie rod; the second steering electric motor mechanism is connected to the other of the pair of steering road wheels through a second steering tie rod; and the first electromagnetic valve and the second electromagnetic valve are both connected to the oil tank to control communication between an oil pipe and the oil tank;

the mode selection and display unit comprises a first mode selection button, a second mode selection button, a third mode selection button and a central control panel; and the electronic control unit is connected to the road-feeling motor, the TAS, the electromagnetic clutch, the first lead screw position sensor, the second lead screw position sensor, the first electromagnetic valve, the second electromagnetic valve, the first steering electric motor mechanism, the second steering electric motor mechanism, the first mode selection button, the second mode selection button and the third mode selection button through a signal wire, respectively; and the electronic control unit is connected to the central control panel through a controller area network (CAN) bus.

2. The electric multi-mode steer-by-wire system of claim 1, wherein the electric multi-mode steer-by-wire system is configured to be controlled by the electronic control unit to achieve switching among a two-side steering-road-wheel independent steer-by-wire mode, a steering-trapezoidal steer-by-wire mode and an electric power steering mode according to vehicle dynamics state and a fault failure state of the steering execution unit, or to be manually controlled to achieve the switching among the two-side steering-road-wheel independent steer-by-wire mode, the steering-trapezoidal steer-by-wire mode and the electric power steering mode through selection of the first mode selection button, the second mode selection button or the third mode selection button; and the steering-trapezoidal steer-by-wire mode and the electric power steering mode are configured to play a fail-to-safe backup role for the two-side steering-road-wheel independent steer-by-wire mode; and the electric power steering mode is also configured to play a fail-to-safe backup role for the steering-trapezoidal steer-by-wire mode.

3. The electric multi-mode steer-by-wire system of claim 1, wherein the road-feeling motor is connected to the upper transmission shaft through the reducer; an upper end of the torsion bar is connected to a lower end of the steering drive shaft through one of the two pins; a lower end of the torsion bar is connected to an upper end of the upper transmission shaft through the other of the two pins; the TAS is mounted on the steering drive shaft; an upper end of the steering drive shaft is connected to the steering hand wheel; a lower end of the upper transmission shaft is connected to an upper end of the electromagnetic clutch through the first steering universal joint; and a lower end of the electromagnetic clutch is connected to the lower transmission shaft through the second steering universal joint.

4. The electric multi-mode steer-by-wire system of claim 1, wherein the first steering electric motor mechanism comprises a first motor housing, a first end cover, a first stator, a first rotor, a first lead screw, a first seal ring and a first oil collar;

the second steering electric motor mechanism comprises a second motor housing, a second end cover, a second stator, a second rotor, a second lead screw, a second seal ring and a second oil collar;

the first seal ring and the second seal ring are O-shaped;

the first housing is boltedly connected to the steering gear;

the second housing is boltedly connected to the steering gear;

the first end cover is boltedly connected to the first motor housing;

the second end cover is boltedly connected to the second motor housing;

the first stator is fixed at an inner wall of the first motor housing;

the second stator is fixed at an inner wall of the second motor housing;

the first rotor is provided with a first central threaded inner hole; and the first rotor is supported on the first motor housing through a first bearing;

the second rotor is provided with a second central threaded inner hole; and the second rotor is supported on the second motor housing through a second bearing;

the first lead screw has an inner hydraulic chamber with a bottom hole, and an outer threaded cylindrical surface; and the first lead screw is matched with the first rotor to form a first sliding screw pair, so as to convert rotation of the first rotor into translation of the first lead screw;

the second lead screw has an inner hydraulic chamber with a bottom hole, and an outer threaded cylindrical surface; and the second lead screw is matched with the second rotor to form a second sliding screw pair, so as to convert rotation of the second rotor into translation of the second lead screw;

the first O-shaped seal ring is provided inside the first lead screw to seal the inner hydraulic chamber of the first lead screw;

the second O-shaped seal ring is provided inside the second lead screw to seal the inner hydraulic chamber of the second lead screw;

the first oil collar is fixed at the bottom hole of the first lead screw to realize pipe connection between the inner hydraulic chamber of the first lead screw and the first electromagnetic valve; and the second oil collar is fixed at the bottom hole of the second lead screw to realize pipe connection between the inner hydraulic chamber of the second lead screw and the second electromagnetic valve.

5. The electric multi-mode steer-by-wire system of claim 4, wherein the steering gear comprises a steering gear housing, a steering gear shaft, a third end cover, a third seal ring, a first nut, a second nut, a rack support base, a rack, an adjustment screw plug and a third nut;

the steering gear housing is configured to accommodate parts of the steering gear; one end of the steering gear housing is connected to the first motor housing to form a chamber to provide space for retraction of the first lead screw, and the other end of the steering gear housing is connected to the second motor housing to form a chamber to provide space for retraction of the second lead screw;

the steering gear shaft is mounted on an inner wall of the steering gear housing through a third bearing; an upper end of the steering gear shaft is mechanically connected to the lower transmission shaft through the third steering universal joint to transmit a steering torque; and a middle portion of the steering gear shaft is provided with a pinion;

the third end cover is boltedly and fixedly connected to the steering gear housing;

the third seal ring is provided between the third end cover and the steering gear shaft to achieve sealing of lubricating greases;

the first nut is connected to the steering gear shaft through a first screw thread pair;

the second nut is connected to the steering gear housing through a second screw thread pair;

the rack is supported on the steering gear housing through the rack support base and a bushing, and is engaged with the pinion at the middle portion of the steering gear shaft for transmission; and the rack is sealed with two ends of the first lead screw to form a first hydraulic cylinder, and sealed with two ends of the second lead screw to form a second hydraulic cylinder;

the adjustment screw plug is serewedly arranged in the steering gear housing, and is configured to press the rack support base by means of a spring to eliminate transmission clearance between the rack and the pinion; and the third nut is configured to lock the adjustment screw plug.

* * * * *